US008758000B2

(12) United States Patent
Puliga et al.

(10) Patent No.: US 8,758,000 B2
(45) Date of Patent: Jun. 24, 2014

(54) APPARATUS FOR MOULDING PLASTIC MICRO-PIECES BY ULTRASOUND

(71) Applicant: Fundació Privada Ascamm, Cerdanyola del Vàlles (ES)

(72) Inventors: Francesco Puliga, Cerdanyola del Vàlles (ES); Matías Sacristán Erriquez, Cerdanyola del Vàlles (ES); Francisco Javier Plantà Torrallba, Cerdanyola del Vàlles (ES); Alfons Navarro Solanilla, Castelldefels (ES)

(73) Assignee: Fundacio Privada Ascamm (ES)

(*) Notice: Subject to any disclaimer, the term of this patent is extended or adjusted under 35 U.S.C. 154(b) by 0 days.

(21) Appl. No.: 13/675,053

(22) Filed: Nov. 13, 2012

(65) Prior Publication Data

US 2013/0171287 A1 Jul. 4, 2013

(30) Foreign Application Priority Data

Nov. 14, 2011 (ES) .................. 201101112 U

(51) Int. Cl.
| | |
|---|---|
| B29B 13/08 | (2006.01) |
| B29C 35/02 | (2006.01) |
| B29C 45/58 | (2006.01) |
| B60S 5/02 | (2006.01) |
| E01F 13/04 | (2006.01) |
| B29C 45/00 | (2006.01) |
| B29C 45/53 | (2006.01) |

(52) U.S. Cl.
CPC ............ B29B 13/08 (2013.01); B29C 35/0261 (2013.01); B09C 2791/008 (2013.01); B29C 2045/0094 (2013.01); B29C 45/585 (2013.01); B60S 5/02 (2013.01); B29C 45/531 (2013.01); E01F 13/046 (2013.01)
USPC ................. 425/174.2; 425/117; 425/129.1; 425/432; 425/451.9; 425/456; 264/442; 264/478

(58) Field of Classification Search
USPC ........ 425/117, 129.1, 432, 451.9, 456, 174.2; 264/442, 443, 478
See application file for complete search history.

(56) References Cited

U.S. PATENT DOCUMENTS 3,635,609 A * 1/1972 Balamuth .................. 425/3
4,115,489 A 9/1978 Macfee
(Continued)

FOREIGN PATENT DOCUMENTS

| EP | 930144 | 7/1999 |
|---|---|---|
| JP | 6328451 | 11/1994 |
| WO | 2009/027569 A1 | 3/2009 |

OTHER PUBLICATIONS

Gärtner, "Tagunsbeitrag: Analyse von neuen Plastifizierungskonzepten für das Mikrospritzgiessen". 21. Internationales Kunstofftechnisches Kolloquium, 27.02-01.03.2002, Feb. 28, 2002, pp. 1-19.

*Primary Examiner* — Joseph S. Del Sole
*Assistant Examiner* — Nahida Sultana
(74) *Attorney, Agent, or Firm* — Hess Patent Law Firm LLC; Robert J. Hess

(57) ABSTRACT

The apparatus comprises a melting chamber (6) in communication with a molding cavity made up by two half-molds (1, 2) in a close position, an inlet duct (3) through which plastic material is fed into said melting chamber (6), an ultrasound vibration element (4) activated by an ultrasound generator (5) and provided with an end portion inserted in the melting chamber (6) through an access opening thereof, and motion means for generating a relative displacement between the ultrasound vibration element (4) and the melting chamber (6). The ultrasound vibration element (4) is supported by adjustment means so as to adjust the position of a longitudinal axis (E) thereof in two cross directions (X, Y) perpendicular to each other and perpendicular to an axial direction (Z) parallel to a longitudinal axis of the melting chamber (6).

12 Claims, 3 Drawing Sheets

(56) References Cited

U.S. PATENT DOCUMENTS

| | | | |
|---|---|---|---|
| 4,678,420 A | * | 7/1987 | Inoue .......................... 425/144 |
| 4,784,591 A | | 11/1988 | Ackermann |
| 6,203,747 B1 | * | 3/2001 | Grunitz ........................ 264/443 |
| 6,361,733 B1 | * | 3/2002 | Eicher et al. .................. 264/443 |
| 2010/0272843 A1 | | 10/2010 | Planta Torralba et al. |

* cited by examiner

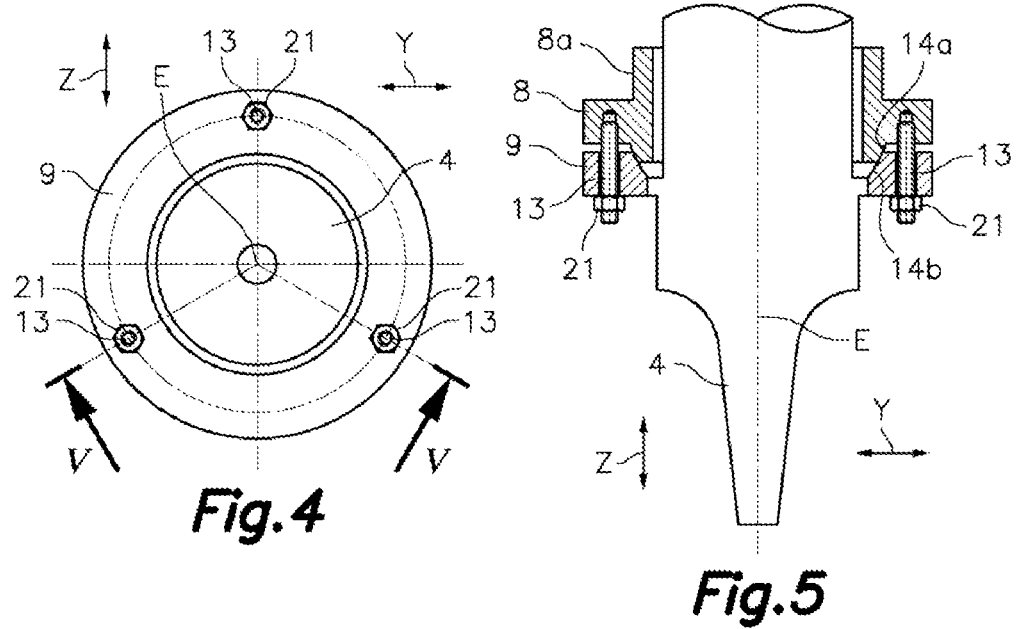

APPARATUS FOR MOULDING PLASTIC MICRO-PIECES BY ULTRASOUND

FIELD OF THE ART

The present invention relates in general to an apparatus for moulding plastic micro-pieces by ultrasound and, more in particular, to an ultrasound plastic moulding apparatus comprising adjustment means for adjusting the position of the ultrasound vibration element relative to a melting chamber.

BACKGROUND OF THE INVENTION

In the publication by Gärtner, "Tagunsbeitrag: Analyse von neuen Plastifizierungskonzepten für das Mikrospritzgiessen". 21. INTERNATIONALES KUNSTOFFTECHNISCHES KOLLOQUIUM, 27.02-Jan. 3, 2002, 28 Feb. 2002 Feb. 28, 2002), pages 1-19, the use of an ultrasound device for moulding plastic micro-pieces is described.

Other patents related to this technology are U.S. Pat. No. 4,115,489, EP 930144, JP 6328451 and U.S. Pat. No. 4,784, 591.

WO 2009/027569, belonging to present applicant, describes an ultrasound device for moulding plastic micro-pieces that uses ultrasonic vibration as a source of energy for the melting the plastic, contemporarily with the access to the moulding cavity or cavities by, or the filling thereof with the molten plastic. This patent application describes the use of a sonotrode, which works as a plasticising unit operating through ultrasonic vibration, and an assembly arrangement of said sonotrode in an annular support provided with an extended portion that is inserted inside and attached to a member having outer spherical surfaces that makes up a ball joint allowing a swivelling movement for the sonotrode assembly and providing the self-centring of the tip thereof inside the melting chamber.

The apparatus of the present invention is characterised by an alternative assembly arrangement of a sonotrode.

DISCLOSURE OF THE INVENTION

The present invention provides an apparatus for moulding of plastic micro-pieces by ultrasound comprising a couple of half-moulds movable between a closed position, in which both define a moulding cavity, and an open position; a melting chamber associated with one of said half-moulds and which is in communication with said moulding cavity when the half-moulds are in the closed position; an inlet duct through which plastic material is fed into said melting chamber; an ultrasound vibration element associated with an ultrasound generator and provided with an end portion tightly and centrally inserted in the melting chamber through an access opening thereof; and motion means for generating a relative displacement between said ultrasound vibration element and the melting chamber so that said end portion will interfere with the plastic material being fed and exert a pressure thereon of a predetermined magnitude when said ultrasound generator is activated. The ultrasound vibration element is supported by adjustment means configured to provide for the adjustment of the position of a longitudinal axis of the ultrasound vibration element in two cross directions perpendicular to an axial direction parallel to a longitudinal axis of the melting chamber.

In an embodiment, said adjustment means are configured to further adjust the inclination of said longitudinal axis of the ultrasound vibration element relative to said axial direction parallel to the longitudinal axis of the melting chamber.

The possibility of adjusting the position of the ultrasound vibration element relative to the melting chamber allows high precision in the melting of plastic material in the melting chamber and its feeding into the moulding cavity, and this ensures high quality in the moulded plastic micro-pieces obtained.

In an embodiment, the adjustment means for adjusting the position of the longitudinal axis of the ultrasound vibration element in two cross directions perpendicular to said axial direction comprise three or more movable members installed in a fixed support relative to a frame of the apparatus and arranged to press on three different sides of a cylindrical surface of an intermediate piece in which the ultrasound vibration element is affixed. The adjustment means further comprise driving means for individually moving each of said three movable members. For instance, said three or more movable members can comprise two movable wedges arranged so as to contact two opposite sides of said cylindrical surface of the intermediate piece, and a movable pusher arranged to contact a third side of the cylindrical surface and push it against said two movable wedges.

Said driving means can comprise, for instance, rotatable rods installed on said fixed support so that they can rotate but not slide axially, each of said rotatable rods having a threaded portion engaging a threaded bore formed in the respective moving wedge, and a threaded portion formed on said movable pusher and engaging a threaded bore formed in the fixed support. Both the rotatable rods and the movable pusher have a coupling element on one end configured to be engaged by a torque-applying tool, such as an Allen key, an adjustable wrench or a screwdriver. Preferably, the rotatable rods and the movable pusher are parallel to one another and their engaging elements are accessible on one and the same side of the fixed support. In an alternative embodiment, the rotatable rods and the pusher are actuated by respective motor-driven mechanisms.

This way, causing the rotatable rods and the movable pusher to turn in one or another of the opposite directions, the intermediate piece changes its position in two directions relative to the fixed support and the ultrasound vibration element attached to the intermediate piece changes the position of its longitudinal axis relative to the axial direction.

In an embodiment, the ultrasound vibration element is attached to a clamp which is fastened in turn on said intermediate piece. In such a case, the adjustment means for adjusting the inclination of the longitudinal axis of the ultrasound vibration element relative to the axial direction comprise three or more threaded bolts substantially parallel to said axial direction that fasten said clamp to the intermediate piece. These three or more threaded bolts are arranged around the ultrasound vibration element and their ends are engaged with respective nuts configured to be engaged by a torque-applying tool, so that they are independently operable. In an alternative embodiment, the threaded bolts and/or the nuts are actuated by respective motor-driven mechanisms.

In an embodiment, the intermediate piece has a convex spherical portion engaging a concave spherical portion formed on the clamp, or vice versa, making up a ball joint element, and said convex and concave spherical portions are located among said three or more threaded bolts, so that by tightening or loosing the nuts engaged with the threaded bolts the clamp changes its inclination relative to the intermediate piece and the ultrasound vibration element attached to the clamp changes its inclination relative to the axial direction.

The apparatus comprises, in one embodiment, a frame supporting one of the first and second half-moulds and guide members along which a couple of slides move. A first slide bears the other of the first and second half-moulds, with the melting chamber associated therewith and the inlet duct. The second slide bears the ultrasound vibration element associated to the ultrasound generator. The first slide is movable by driving means between positions corresponding to said open and closed positions of the first and second half-moulds, and said second slide is movable by driving means between positions corresponding to a loading position and a melting position of the ultrasound vibration element. In addition, the guide members are preferably sized to additionally allow for the movement of the first and second slides to respective maintenance positions away from each other so as to allow for easy access to the elements installed on each slide.

BRIEF DESCRIPTION OF THE DRAWINGS

The above and other features and advantages will become more apparent from the following description of exemplary embodiments with reference to the attached drawings, wherein:

FIG. 4 is a bottom plan view of one part of the adjustment means including a clamp wherein the ultrasound vibration element is attached; and FIG. 5 is a partial cross-sectional view taken along the planes V-V of FIG. 4 showing one part of the adjustment means according to one embodiment.

DETAILED DESCRIPTION OF EXEMPLARY EMBODIMENTS

Figure 1:
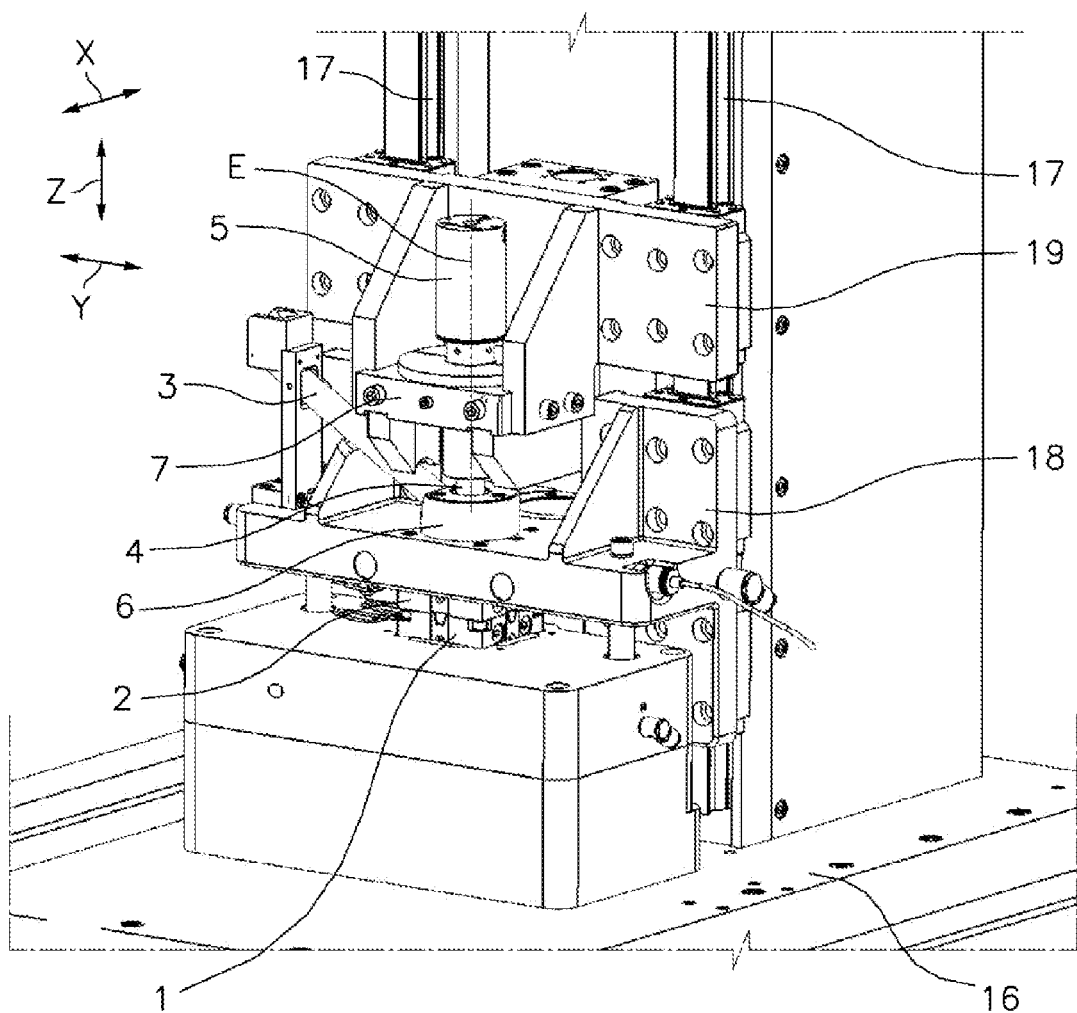
FIG. 1 is a partial perspective view of the apparatus for moulding plastic micro-pieces by ultrasound according to an embodiment of the present invention.

Referring first to FIG. 1, there is partially shown an apparatus for moulding plastic micro-pieces by ultrasound according to an embodiment of the present invention. The apparatus comprises a frame 16 supporting a first half-mould 1 arranged in a horizontal position and guide members 17 arranged in a vertical position. A first slide 18 and a second slide 19 move along the guide elements 17 independently driven by respective driving means.

On said first slide 18, a second half-mould 2, a melting chamber 6 in communication with a moulding half-cavity formed in said second half-mould 2, and an inlet duct 3 through which the plastic material is fed into said melting chamber 6, are installed. In operation, this first slide 18 moves between a lifted position, in which the first and second half-moulds 1, 2 are in an open position, and a lowered position, in which the first and second half-moulds 1, 2 are in a closed position, defining a moulding cavity therebetween. Thus, when the first and second half-moulds 1, 2 are in said closed position, the melting chamber 6 is in communication with said moulding cavity defined therebetween.

The melting chamber 6 has a longitudinal axis arranged in a vertical position and, throughout this description, any direction parallel to said longitudinal axis of the melting chamber 6 will be designated as axial direction Z, and two mutually perpendicular directions which are perpendicular in turn to the longitudinal axis of the melting chamber 6 will be designated as cross directions X, Y.

On the second slide 19, an ultrasound vibration element 4, activated by an ultrasound generator 5, is installed. This ultrasound vibration element 4 is provided with an end portion that is tightly and centrally inserted in the melting chamber 6 through a top access opening thereof. This second slide 19 is movable between a lifted position, in which the ultrasound vibration element 4 is in a loading position that allows the plastic material, for instance in the shape of pellets, to be fed into the melting chamber 6 through the inlet duct 3, and a lowered position corresponding to a melting position, in which said end portion of the ultrasound vibration element 4 interferes with the plastic material being fed and exerts a pressure thereon of a predetermined magnitude when said ultrasound generator 5 is activated.

In operation, the first slide 18 firstly moves to its lowered position, whereby the mould is closed and the load of the plastic material into the melting chamber 6 is effected through the inlet duct 3, and then the second slide 19 moves to its lowered position, whereby the ultrasound vibration element 4 is located in the melting position at the same time as the ultrasound generator 5 is activated. Once the micro piece is injected, both slides 18, 19 move to their lifted positions and an ejector system (not shown) ejects the newly moulded micro piece, and this cycle is repeated continuously until the batch of desired moulded micro-pieces is completed. In the illustrated embodiment, the guide members 17 are sized to additionally allow for the movement of the first and second slides 18, 19 to respective maintenance positions (not shown) in which they are sufficiently away from each other and from the first half-mould to allow for easy access to the elements installed thereon with maintenance purposes.

The second slide 19 bears a fixed support 7 jointly attached thereto, and the ultrasound vibration element 4 is supported on said fixed support 7 by adjustment means that allow for the adjustment of the position of a longitudinal axis E of the ultrasound vibration element 4 (FIGS. 2 to 5) in said two cross directions X, Y perpendicular to said axial direction Z and for the adjustment of the inclination of said longitudinal axis E of the ultrasound vibration element 4 relative to the axial direction Z.

Figure 2:
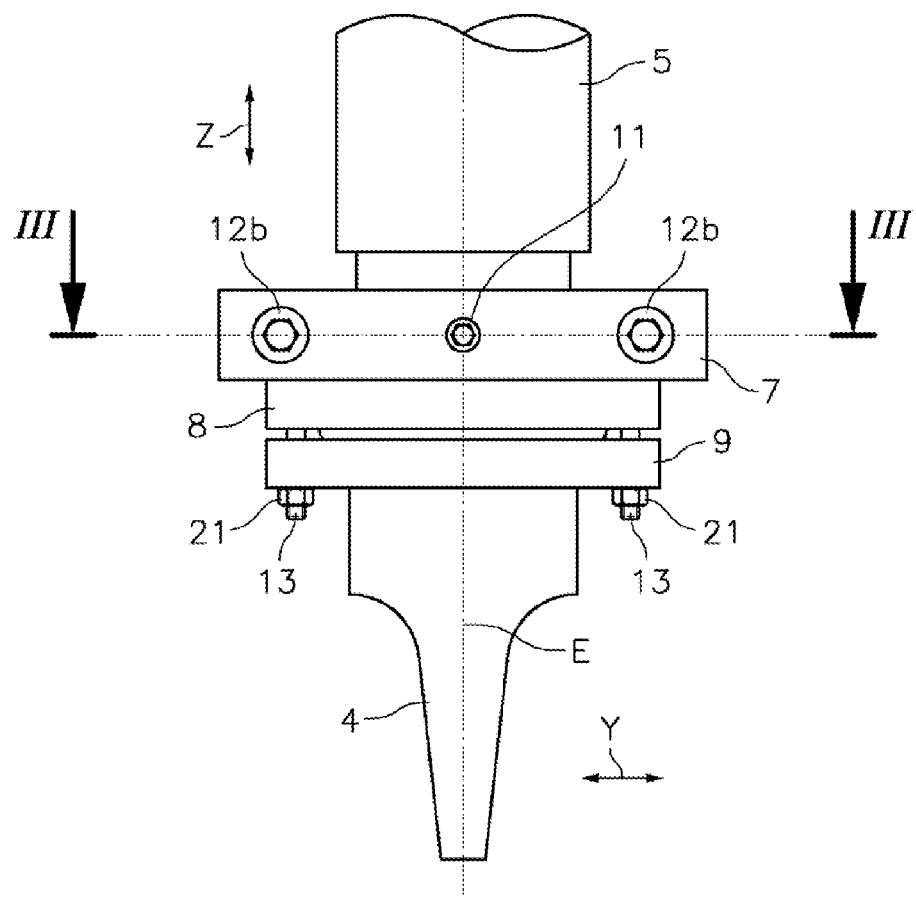
FIG. 2 is a partial front view of an ultrasound vibration element supported on a frame of the apparatus by adjustment means.

FIG. 2 shows the fixed support 7, an intermediate piece 8 attached to the fixed support by a part of the adjustment means that allows for the adjustment of the position in the cross directions X, Y and a clamp 9 attached to said intermediate piece 8 by another part of the adjustment means that allows for the adjustment of the inclination relative to the axial direction Z. The ultrasound vibration element 4 is firmly attached to said clamp 9.

Figure 3:
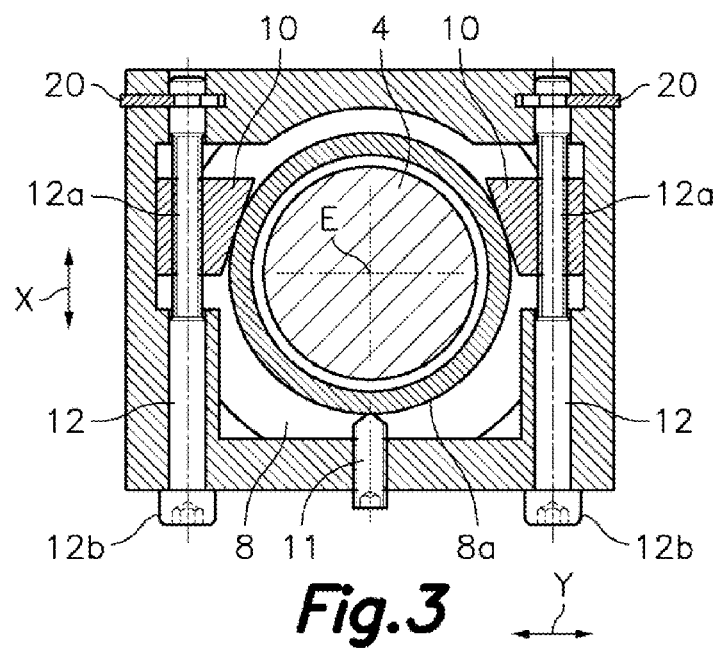
FIG. 3 is a cross-sectional view taken along the plane III-III of FIG. 2.

FIG. 3 shows the part of the adjustment means that allows for the adjustment of the position of the cross directions X, Y. This part of the adjustment means comprises three movable members installed in the fixed support 7 and arranged to press on three different sides of a cylindrical surface 8a of the intermediate piece 8, and driving means for individually moving each of said three movable members. Two of the movable members are two movable wedges 10 arranged to contact two opposite sides of said cylindrical surface 8a, and the third movable member is a movable pusher 11 arranged to contact the cylindrical surface 8a and push it against the two movable wedges 10.

The driving means of the two movable wedges comprise respective rotatable rods 12 installed so that they can rotate in said fixed support 7. Retention members 20 cooperate with circumferential grooves of the rotatable rods 12 to prevent them from axially sliding relative to the fixed support. Each of the rotatable rods 12 has a threaded portion 12a engaging a threaded bore formed in the respective moving wedge 10 and a head 12b provided with a coupling element configured to be engaged by a torque-applying tool, by means of which each of the rotatable rods 12 can be made to individually turn so as to shift the respective moving wedge 10.

The driving means of the movable pusher 11 comprise a threaded portion formed on the movable pusher 11 and engaging a threaded bore formed in the fixed support 7. The movable pusher 11 also has, on one end, a coupling element configured to be engaged by a torque-applying tool. The two rotatable rods 12 and the movable pusher 11 are parallel and they have their coupling elements easily accessible on one and the same side of the fixed support 7. By moving the two wedges 10 and the movable pusher 11 equal distances, a shift of the longitudinal axis E of the ultrasound vibration element 4 in the cross direction X is achieved. By moving the two wedges different distances or in opposite directions, a shift of the longitudinal axis E of the ultrasound vibration element 4 in the cross direction Y is achieved. Both movements can be combined.

FIGS. 4 and 5 show the part of the adjustment means allowing for the adjustment of the inclination relative to the axial direction Z according to one embodiment wherein this part of the adjustment means comprises three threaded bolts 13 (although there could be more than three) substantially parallel to said axial direction Z, attached to the intermediate piece 8 and inserted through corresponding holes formed in the clamp 9, and respective nuts 21 engaged with said threaded bolts 13 and which fasten the clamp 9 to the intermediate piece 8. As shown in FIG. 4, these threaded bolts 13 are arranged in regular, equal intervals around a central opening of the clamp 9 wherein the ultrasound vibration element 4 is firmly attached. Obviously, the nuts 21 are independently operable by means of a torque-applying tool.

In an alternative embodiment (not shown), instead of the threaded bolts 13 being attached to the intermediate piece and being engaged with respective nuts 21, the threaded bolts are part of screws inserted through holes formed in the clamp 9 and engaging corresponding threaded bores formed in the intermediate piece 8. In this case, the screws have on one of their ends a coupling element configured to be engaged by a torque-applying tool, and the coupling elements are easily accessible on one and the same side of the clamp.

In the embodiment shown in FIG. 5, the intermediate piece 8 has a convex spherical portion 14a formed around a central opening through which the ultrasound vibration element 4 is inserted with some slack, and on the clamp 9 there is formed a concave spherical portion 14b surrounding the corresponding central opening. These convex and concave spherical portions 14a, 14b are mutually engaged so that they make up a ball joint element among the three threaded bolts 13. By tightening or loosing the nuts 21, and by virtue of the ball joint element provided by the concave and convex spherical portions 14a, 14b, it is possible to change the inclination of the clamp 9 relative to the intermediate piece 8 and thereby the inclination of the longitudinal axis E of the ultrasound vibration element 4 relative to the axial direction Z.

It is to be understood that an opposite construction, with an equivalent result, is possible, wherein the convex spherical portion is formed on the clamp and the concave spherical portion is formed on the intermediate piece.

A person skilled in the art will be able to carry out modifications and variations to the exemplary embodiments shown and described without departing from the scope of the present invention as defined in the attached claims.

The invention claimed is:

1. An apparatus for moulding plastic micro-pieces by ultrasound comprising:
    a first half-mould and a second half-mould, both being movable between a closed position in which they define a moulding cavity, and an open position;
    a melting chamber associated with one of said first and second half-moulds and in communication with said moulding cavity in said closed position;
    an inlet duct through which plastic material is fed into said melting chamber;
    an ultrasound vibration element associated with an ultrasound generator and provided with an end portion tightly and centrally inserted in the melting chamber through an access opening thereof;
    a slide driven by driving means along a guiding member for generating a relative displacement between said ultrasound vibration element and the melting chamber so that said end portion will interfere with the plastic material being fed and exert a pressure thereon of a predetermined magnitude when said ultrasound generator is activated,
    wherein the ultrasound vibration element is supported by adjustment means comprising at least three movable members installed in a fixed support and arranged to press on three different sides of a cylindrical surface of an intermediate piece to which the ultrasound vibration element is fixed, and driving means for individually moving each of said three movable members,
    wherein said adjustment means is configured to provide for the adjustment of the position of a longitudinal axis of said ultrasound vibration element in at least two cross directions perpendicular to each other and perpendicular to an axial direction parallel to a longitudinal axis of the melting chamber.

2. The apparatus according to claim 1, wherein said adjustment means are configured to further adjust the inclination of said longitudinal axis of the ultrasound vibration element relative to said axial direction parallel to the longitudinal axis of the melting chamber.

3. The apparatus according to claim 1, wherein said at least three movable members comprise two movable wedges, arranged to contact two opposite sides of said cylindrical surface, and a movable pusher arranged to push the cylindrical surface against said two movable wedges.

4. The apparatus according to claim 3, wherein said driving means comprise rotatable rods installed on said fixed support so that they can rotate, but not slide axially, each of said rotatable rods having a threaded portion engaging a threaded bore formed in the respective moving wedge.

5. The apparatus according to claim 4, wherein each of said rotatable rods has a head provided with a coupling element configured to be engaged by a torque-applying tool.

6. The apparatus according to claim 4, wherein said driving means further comprise a threaded portion formed on said movable pusher and engaging a threaded bore formed in said fixed support, said movable pusher having a coupling element on one end configured to be engaged by a torque-applying tool.

7. The apparatus according to claim 4, wherein said rotatable rods and said movable pusher are parallel and have their coupling elements accessible on one and the same side of the fixed support.

8. The apparatus according to claim 1 wherein the ultrasound vibration element is attached to a clamp and said adjustment means comprise at least three threaded bolts substantially parallel to said axial direction that fasten said clamp to said intermediate piece, wherein said threaded bolts are distributed around the ultrasound vibration element and are independently operable.

9. The apparatus according to claim 8, wherein the intermediate piece has a convex spherical portion engaging a concave spherical portion formed on the clamp, or vice versa, said convex and concave spherical portions being located among said at least three threaded bolts.

10. The apparatus according to claim 8, wherein said at least three threaded bolts are attached to the intermediate piece, inserted through holes formed in the clamp and engaged with respective nuts (21) configured to be engaged by a torque-applying tool.

11. The apparatus according claim 1, wherein said apparatus comprises a frame supporting one of the first and second half-moulds and guide members along which a first slide on which the other of the first and second half-moulds, the melting chamber and said inlet duct are installed, and a second slide on which the ultrasound vibration element and said ultrasound generator are installed, move, where said first slide is movable by driving means between positions corresponding to said open and closed positions of the first and second half-moulds and said second slide is movable by driving means between positions corresponding to a loading position and a melting position of the ultrasound vibration element.

12. The apparatus according to claim 11, wherein said guide members are sized to additionally allow for the movement of the first and second slides to respective maintenance positions.

\* \* \* \* \*